Patented Sept. 17, 1946

2,407,814

UNITED STATES PATENT OFFICE 2,407,814

CATALYSTS

Harry A. Cheney, Oakland, Calif., assignor to Shell Development Company, San Francisco, Calif., a corporation of Delaware No Drawing. Application June 21, 1943, Serial No. 491,724

5 Claims. (Cl. 252—251)

This invention relates to the manufacture of supported catalysts and relates more particularly to the manufacture of catalysts comprising at least one metal of group VIII in combination with activated carbon which have been found to be particularly effective in the conversion of olefinic hydrocarbons to the lower boiling of the linear polymers thereof, although they can be employed also in other types of hydrocarbon conversions.

Catalysts comprising elements of group VIII find application in a wide variety of processes, particularly those involving the conversion of hydrocarbons such as, for example, hydrogenation, polymerization, dehydrogenation, isomerization, gas pyrolysis, aromatization, etc. These metals in a limited number of cases are used per se in relatively large fragments, pieces or chunks. Most catalytic processes, however, require their usage in dispersed or finely-divided form deposited upon suitable support materials. Support materials which may be employed comprise materials of porous structure such as activated carbon, pumice, fire brick, as well as synthetically prepared or naturally-occurring siliceous or aluminous materials such as, for example, clays, bentonite, bauxite, diatomaceous earth, silica gel, Activated Alumina, active or activated blends or compounds of silica and alumina, etc. These various types of carrier materials, though individually applicable as supports for the catalyst as used in the execution of a number of reactions, are, however, not equivalent. It has been found that characteristics of the catalysts are often dependent upon the nature of the particular support material employed and that the catalytic effect of the elements of group VIII may be modified or changed by judicious selection of a particular support material combined therewith.

It has been found that catalysts comprising an element of group VIII in combination with activated carbon possess the ability of catalyzing the conversion of olefinic hydrocarbons to a product which can be made to predominate in one or several of the lower boiling of the linear polymers thereof at temperatures below about 350° C. A particularly advantageous characteristic of this catalyst combination is the ability to convert even the lower boiling of the olefinic hydrocarbons, such as ethylene and propylene, to the lower boiling of the linear polymers thereof to a degree not possessed by other types of available polymerization catalysts. Their ability to promote the conversion of ethylene and propylene to products predominating in butylene and hexylene, respectively, materials highly desirable as starting materials in the production of such products as synthetic rubber and aviation fuels, renders these catalysts exceedingly valuable. Of these catalysts those comprising cobalt and/or nickel in combination with activated carbon are particularly outstanding in their ability to effect this desirable polymerization reaction. Catalysts comprising cobalt are somewhat preferred over those comprising nickel since they enable the conversion of the olefinic hydrocarbon to the lower boiling of the linear polymers thereof at temperatures below 250° C. and preferably not substantially in excess of 150° C., whereas those comprising nickel generally require somewhat higher temperatures, for example, up to about 350° C., to attain equivalent results.

Methods heretofore generally employed in the preparation of these catalysts comprise the impregnation of the carrier material with a solution of a compound of an element of group VIII and subsequently heating the resulting mixture at atmospheric pressure to effect decomposition of the deposited compound. Though variations in the method of preparing these catalysts have been disclosed, such methods have generally been handicapped by serious disadvantages. The resulting catalysts are generally lacking in uniformity with respect to activity. Another disadvantage is the often total absence of a particular characteristic such as, for example, in the case of catalysts comprising an element of group VIII and activated carbon, the ability to catalyze the conversion of olefins to a product predominating in the lower boiling of the linear polymers thereof.

The particular characteristic of the resultant catalyst, it has been found, is dependent not only upon the particular element of group VIII and the particular support material chosen but also upon the particular compound of the element of group VIII used as a starting material. Thus, catalysts comprising cobalt and/or nickel prepared by combining an activated carbon with a salt such as the acetate and chloride of these metals, the subsequent reduction of these compounds, produces a catalyst possessing little, if any, ability to promote the conversion of ethylene to the lower boiling of the linear polymers thereof. On the other hand, when utilizing a salt such as, for example, a salt obtained by the interaction of an element of group VIII with an oxygen-containing mineral acid, for example, cobalt nitrate, nickel nitrate, etc., as starting materials, the resulting catalysts possess these desirable characteristics to a surprising degree. However, the production of the catalyst from salts particularly prone to undergo spontaneous ignition during heating, such as the nitrates, especially when conducted on a large scale by methods utilized heretofore, often results in a spontaneous decomposition to varying degrees of the salt, thereby not only producing materials ineffective as catalysts but presenting serious hazards. When the production of some material in the absence of marked spontaneous decomposition is attained by such methods, the resulting product nevertheless generally consists of a substantial proportion which is lacking in the desired characteristic activity and a remaining portion which is devoid to a marked degree of uniformity with respect to composition and catalytic activity. This, it is found, is due to at least a substantial degree to overheating of portions of the catalyst resulting from spontaneous ignition which, though present to a lesser and localized degree, is, nevertheless, often unavoidably encountered to an undesirable extent in methods of catalyst preparation resorted to heretofore.

It is an object of the present invention to provide an improved method for the more efficient preparation of catalytic materials comprising cobalt and/or nickel and activated carbon wherein the above disadvantages are obviated to at least a substantial degree. Another object of the invention is the provision of an improved method for the more efficient manufacture of catalysts comprising cobalt and/or nickel in combination with activated carbon having greater uniformity with respect to composition and catalytic activity than those obtained by methods available heretofore. A still further object of the invention is the provision of an improved method for the more efficient production of catalysts comprising cobalt and/or nickel in combination with activated carbon, particularly effective in the conversion of olefinic hydrocarbons to the lower boiling of the linear polymers thereof. Other objects and advantages of the invention will become apparent from the following description thereof.

In accordance with the present invention an activated carbon is admixed in a suitable vessel with an aqueous solution of a nitrate of cobalt and/or nickel. The resulting mixture is heated under conditions assuring a slow and gradual increase in temperature of the mixture to a maximum temperature not substantially in excess of that enabling the maintenance of at least a part of the solvent in the vessel. Additional solvent is intermittently or continuously added to the vessel during the heating operation until at least partial decomposition of the greater part of the nitrate has been effected. Thereafter the addition of solvent is stopped and the temperature slowly increased to a temperature not substantially in excess of and preferably below the maximum temperature required to bring about the decomposition of the remaining portion of the nitrate. When generation of decomposition products to any susbtantial degree has ceased, the heating is discontinued. The catalyst is cooled and removed from the vessel.

In a preferred method of executing the invention the catalyst is prepared in a sealed rotating drum provided with means for heating and cooling its contents, removing volatilized material therefrom and for varying the pressure therein. Although this type of apparatus is preferred, the use of others comprising stationary vessels is comprised within the scope of the invention. The rotating type of apparatus is preferred not only because it enables the uniform distribution of the metallic element throughout the porous mass but because it enables the attainment of more effective mixing of the components without attrition of the porous material to any substantial degree. It furthermore enables more uniform heating of the mixture thereby providing more effective control of the rate of decomposition as well as more efficient removal of decomposition products and volatilized materials from the mass under treatment.

In preparing the catalyst in accordance with the invention a suitable inorganic porous material, for example, a porous granular carbon such as activated vegetable or animal charcoals as prepared and activated by various commercial suppliers, is introduced into a closed vessel preferably of the rotating type. Suction is thereupon applied to reduce the pressure within the vessel to subatmospheric, for example, in the range of from about 1 to about 25 mm. of mercury. While maintaining the subatmospheric pressure a solution of the metal nitrate is introduced into the vessel.

The salt is preferably introduced into the drum dissolved in a suitable solvent of relatively low volatility. The particular solvent used may vary and will depend upon the solubility of the particular salt therein. When utilizing cobalt nitrate as a starting material water is found to be a suitable solvent. The amount of the salt introduced into the vessel is dependent upon the nature of the particular catalyst to be prepared.

In the preparation of catalysts, comprising cobalt in combination with carbon, particularly effective for the conversion of olefins, it is preferred to add a sufficient amount of the cobalt salt to the carbon to obtain a finished catalyst containing from about 3% to about 35% and preferably from about 5% to 25% of cobalt. Catalytic materials comprising higher or lower concentrations of cobalt, depending upon the particular characteristics desired of the catalyst to be obtained may, however, be prepared in accordance with the process of the invention.

The concentration of the cobalt nitrate in the solution used as a starting material may vary within the scope of the invention. In general, it is preferred to employ a sufficient amount of solvent for the cobalt nitrate to immerse the greater part of the mass of charcoal.

The mixture is then agitated, for example, by rotation of the drum until intimate contact between the solution and charcoal has been established. The pressure in the drum is then increased to at least atmospheric pressure. By this procedure impregnation of the cobalt nitrate into the inorganic porous material is obtained to the degree essential to the attainment of a catalyst possessing sufficiently high activity as well as the characteristics essential for its use in such processes as the conversion of olefinic hydrocarbons to the lower boiling of the linear polymers thereof. The invention is, however, not necessarily limited to this particular method of impregnating the porous support material and other methods such as impregnation at atmospheric or higher pressures before proceeding with the preparation in accordance with the invention may be resorted to.

After impregnating the charcoal with the solution of cobalt nitrate heat is applied to the drum, which is preferably rotated during the process, to attain a gradual increase in the temperature of the contents therein without occasioning any sudden substantial increase in temperature. During the heating water vapor is continuously removed from the drum, preferably by the application of suction thereon. The cobalt nitrate will undergo gradual decomposition even before the greater part of the water has been removed from the mixture in the drum. Resulting decomposition products, comprising oxides of nitrogen, are removed from the drum together with the water vapor. The heating is continued for a period of time, and up to a maximum temperature, not exceeding that assuring the presence of at least a part, for example about 20% of the water in the drum. When utilizing cobalt nitrate as the starting material a maximum temperature of, for example, about 110° C. and preferably of about 105° C. is not exceeded. When the greater part of the water has been removed from the mixture, but prior to its complete removal, an additional amount of water is introduced into the drum and the heating operation is continued within the prescribed limited temperature range until the greater part of the water has again been removed from the drum. The intermittent addition of solvent is repeated until at least 50% and preferably 70% or more of the combined nitrogen has been removed from the drum.

The amount of water added during the consecutive additions may vary within the scope of the invention. It has been found suitable to add an amount equal to about one half of the amount first required to effect submersion of the catalyst. The extent to which it is removed prior to further additions may also vary within the scope of the invention. In general, it is preferred to add the additional amounts when about 80% of the water within the drum, comprising water of crystallization of the cobalt nitrate, has been removed therefrom. The amount of water removed prior to each successive addition may be progressively increased during the course of the operation, care being taken however, during this phase of the process that all of the water be not removed.

The process may be modified by effecting the addition of the solvent continuously instead of intermittently during this first or decomposition stage of the process. Under such conditions it is found advantageous, particularly when solvents other than water are used, to provide condensing means to which the effluence from the drum may be passed and vaporized solvent condensed therein under conditions effecting the removal of decomposition products therefrom in the gaseous state, and to return the condensed and cooled solvent to the drum. Under these conditions the temperature is, however, controlled in such manner as not to exceed the maximum temperature of the permissible temperature range in the drum. When utilizing the continuous addition of solvent, optionally comprising the refluxing of the solvent, it is preferred to maintain a gradual increase in the temperature gradient, up to the maximum permissible temperature, during the entire period of this phase of the process.

The solvent added subsequently to the primary impregnation need not necessarily be the same as that originally used to introduced the salt into the drum. Under certain conditions it is found advantageous to utilize different solvents in the impregnation step and in the subsequent solvent addition steps.

When at least the greater part of the salt charged to the drum has undergone substantial decomposition, which in the case of cobalt nitrate will be, for example, when at least 50% and preferably about 70% or more of the combined nitrogen has been removed from the mixture, the heating is continued at the maximum temperature prescribed for this phase of the process until substantially all of the water is removed from the drum. The temperature of the contents of the drum is then gradually increased, in the absence of any further addition of water, to a temperature not substantially in excess of about 400° C. and preferably not substantially in excess of about 300° C. During this second heating period, decomposition products are removed from the drum substantially as rapidly as formed. The heating is continued, while maintaining the temperature of the contents in the drum within the prescribed temperature range, until no further generation of substantial amounts of decomposition products is evidenced. The contents of the drum are then cooled and removed therefrom.

Although the pressure within the drum during the heating steps may be maintained at substantially atmospheric, it is preferred to maintain the drum under partial vacuum to further the decomposition of the cobalt nitrate and facilitate removal of vaporized solvent and decomposition products therefrom. It has been found that particularly active catalysts are produced by employing a subatmospheric pressure during that phase of the heating process conducted after removal of the solvent. Suitable reduced pressures comprise, for example, from about 25 mm. to about 250 mm. mercury pressure.

In a modification of the process of the invention the addition of the cobalt and/or nickel nitrate, for example cobalt nitrate, to the activated carbon is effected in successive steps. A part of the total amount of the cobalt nitrate to be added is initially introduced into the drum containing the carbon prior to beginning the heating. Successive additions of cobalt nitrate are then made simultaneously with the subsequent additions of solvent during the heating operation until the requisite amount of cobalt nitrate has been added to produce the catalyst of the desired composition. This, it has been found, often leads to more efficient catalyst production resulting in catalysts of unusually high activity. Furthermore, it enables the production of active catalysts containing higher proportions of the metallic element than methods wherein the addition is effected in a single step.

In preparing the catalyst in accordance with the invention, it has been found that spontaneous ignition to any substantial degree of even such compounds as cobalt nitrate, so deleterious to the activity of the finished catalyst, and which effect is inherent to a degree often preventing economical production of such catalysts by methods available heretofore, is completely avoided. The resulting catalysts unlike those produced by many other processes are not subject to wide variations in activity due to minor fluctuations in the method of manufacture and are not only exceedingly uniform in composition but unusually stable upon contact with the atmosphere and under storage conditions. The exact composition of the catalysts thus prepared comprising the cobalt and/or nickel in combination with carbon and which are particularly effective for the conversion or treatment of olefinic hydrocarbons is not readily determined. The cobalt and/or nickel may be present therein in the elementary form, in combination with oxygen, in combination with carbon, or in a mixture of these various forms. The carbon, in the particular catalysts comprising this material in combination with cobalt and/or nickel prepared in accordance with the method of the invention, is not merely a diluent or support material but an active component of the catalyst in the absence of which the catalytic effect upon such reactions as the conversion of normally gaseous olefinic hydrocarbons, particularly ethylene, to the lower boiling of the linear polymers thereof is only negligible if not completely absent.

Materials capable of promoting or otherwise modifying the activity of the finished catalyst may be added thereto. Such materials comprising, for example, elements other than cobalt and/or nickel, or compounds thereof, may be added in relatively small amounts to the materials in the catalyst drum during the course of manufacture. The porous materials need not consist of a material of but one type and may comprise a mixture of two or more inorganic materials of porous structure. Thus in the preparation of catalysts comprising cobalt and/or nickel in combination with carbon, inorganic material inert with respect to behavior of the catalysts, such as, for example, pumice, crushed brick, bauxite, clays, etc., may be admixed with the charcoal prior to preparation of the catalyst or even during the course of its preparation. The additional incorporation of a porous material of more rugged structure enables the utilization of carbon of smaller particle size and even in powdered form; the resultant catalyst then comprising an admixture of cobalt and/or nickel and finely-divided carbon deposited upon a central core of the added porous inert material.

Catalysts prepared in accordance with the method of the invention possess appreciable activity and are ready to be utilized as such. If desired, however, the catalyst may be subjected to additional treatments culminating in still greater activity of the catalysts thus produced. Such additional treatments may comprise subjecting of the catalysts to higher temperatures in the order of, for example, about 500° C., while sweeping them with a gas consisting of or comprising hydrogen, nitrogen, carbon dioxide, normally gaseous paraffinic hydrocarbons such as methane, ethane, propane, or mixtures thereof. A method particularly effective for further increasing the activity of catalysts of this type comprises their subjection to an elevated temperature up to, for example, about 500° C., while maintaining them at a subatmospheric pressure, preferably below about 10 mm. mercury.

*Example I*

1800 grams of 6–14 mesh granular cocoanut charcoal was introduced into a rotating drum and the pressure therein reduced to 30 mm. of mercury. While rotating, a solution of 1800 grams of cobalt nitrate hexahydrate in 800 grams of water was introduced into the drum. Heat was applied to the rotating vessel while maintaining the subatmospheric pressure. The heating was continued during a period of 3 hours until a maximum temperature of 105° C. was attained. Approximately 80% of the water initially present (including water of crystallization) was removed during this treatment along with about 20% of the combined nitrogen, chiefly in the form of nitric oxide. At this point 400 grams of water was added and the heating resumed for a period of 2 hours until the temperature again reached 105° C. Approximately 50% of the nitrogen had then been removed from the contents of the drum which still contained about 180 grams of water. 400 grams of water was then again injected into the drum and heating continued for a period of ½ hour until the temperature of the contents was again gradually raised to 105° C. About 100 grams of water then remained in the mixture in the drum along with about 30% of the combined nitrogen. The heat was then adjusted to give a temperature rise of about 1° C. per minute until the temperature reached 300° C. After cooling, the catalyst, which was almost identical in appearance with the original charcoal, was removed from the drum and charged to a reaction chamber.

140 cc. of catalyst prepared by the above procedure was charged to a stainless steel reaction tube. The catalyst was swept with H2 for 3 hours at 300° C. Ethylene was polymerized over the catalyst at 100° C. under 800 pounds pressure. The ethylene flow rate averaged 633 grams per liter of catalyst per hour. In 70.9 hours the catalyst produced 18,600 grams of polymer per liter of catalyst, 66% of which was butylene. The average conversion of ethylene to polymer was 42%.

The catalyst was then regenerated by sweeping with H2 for 3 hours at 300° C. Polymerization of ethylene was resumed under the above conditions of temperature and pressure and an average flow rate of 794 grams of ethylene per liter of catalyst per hour. In 64.8 hours 21,200 grams of polymer were produced per liter of catalyst, 59% of which was butylene. The average conversion of ethylene to polymer was 42%.

I claim as my invention:

1. In the preparation of catalysts comprising cobalt and activated carbon particularly effective in the conversion of olefinic hydrocarbons to the lower boiling of the linear polymers thereof, the method of obtaining catalysts of substantially improved uniformity with respect to composition and catalytic activity which comprises heating an admixture of an aqueous solution of cobalt nitrate and activated carbon in a closed vessel under conditions of progressively increasing temperature not substantially exceeding about 110° C., removing volatilized material and gaseous decomposition products from the vessel, introducing water in successively decreasing amounts into the vessel to assure the presence of water therein throughout said heating, continuing said heating in the presence of added water until at least a substantial part of the cobalt nitrate has undergone decomposition, and thereafter heating the contents of the vessel without further water addition at a higher temperature not substantially in excess of about 400° C. until evolution of substantial amounts of decomposition products has ceased.

2. In the preparation of catalysts comprising cobalt and activated carbon particularly effective in the conversion of olefinic hydrocarbons to the lower boiling of the linear polymers thereof, the method of obtaining catalysts of substantially improved uniformity with respect to composition and catalytic activity which comprises heating an admixture of an aqueous solution of cobalt nitrate and activated carbon in a closed vessel under conditions of progressively increasing temperature not substantially exceeding about 110° C., said cobalt nitrate solution containing insufficient cobalt nitrate to provide the necessary concentration of cobalt in the finished catalyst, removing volatilized material and gaseous decomposition products from the vessel, introducing water in successively decreasing amounts into said vessel to assure the presence of water therein throughout said heating, dissolving sufficient cobalt nitrate in at least a portion of the water so introduced during said heating to provide the necessary concentration of cobalt in the finished catalyst, continuing said heating in the presence of added water until at least a substantial part of the cobalt nitrate has undergone decomposition, and thereafter heating the contents of the vessel without further water addition at a higher temperature not substantially in excess of about 400° C. until evolution of substantial amounts of decomposition products has ceased.

3. In the preparation of catalysts comprising cobalt and activated carbon particularly effective in the conversion of olefinic hydrocarbons to the lower boiling of the linear polymers thereof, the method of obtaining catalysts of substantially improved uniformity with respect to composition and catalytic activity which comprises heating an admixture of an aqueous solution of cobalt nitrate and activated carbon in a closed vessel under conditions of progressively increasing temperature, removing volatilized material and gaseous decomposition products from the vessel, introducing water into the vessel to assure the presence of water therein throughout said heating, continuing said heating in the presence of added water until at least a substantial part of the cobalt nitrate has undergone decomposition, and thereafter heating the contents of the vessel without further water addition at a higher temperature not substantially in excess of about 400° C. until evolution of substantial amounts of decomposition products has ceased.

4. In the preparation of catalysts comprising activated carbon and a metal of the group consisting of cobalt and nickel, the method of obtaining catalysts of improved uniformity with respect to composition and catalytic activity which comprises heating an admixture of activated carbon and an aqueous solution of a nitrate of a metal selected from the group consisting of cobalt and nickel in a closed vessel under conditions of progressively increasing temperature, removing volatilized material and gaseous decomposition products from the vessel, introducing water into the vessel to assure the presence of water therein throughout said heating, continuing said heating in the presence of added water until at least a substantial part of the metal nitrate has undergone decomposition, and thereafter heating the contents of the vessel without further water addition at a higher temperature not substantially in excess of that required to effect decomposition of the remaining nitrate.

5. In the preparation of catalysts comprising activated carbon and a metal selected from the group consisting of cobalt and nickel, the method of obtaining catalysts of improved uniformity with respect to composition and catalytic activity which comprises forming an admixture comprising an activated carbon and a solution of a nitrate of a metal selected from the group consisting of cobalt and nickel in an aqueous solvent, heating said admixture in a closed vessel under conditions of progressively increasing temperature, removing volatilized material and gaseous decomposition products from the vessel, introducing water into the vessel to assure the presence of water therein throughout said heating, continuing said heating in the presence of added water until at least the larger part of the metal nitrate has undergone decomposition, and thereafter heating the contents of the vessel without further addition of water to a higher temperature not substantially in excess of 400° C. until evolution of substantial amounts of decomposition products has ceased.

HARRY A. CHENEY.